(12) United States Patent
Fisher et al.

(10) Patent No.: US 8,842,372 B2
(45) Date of Patent: Sep. 23, 2014

(54) LENS ACTUATOR

(75) Inventors: Charles Fisher, Salt Lake City, UT (US); Ian Harvey, Kaysville, UT (US); Brian Baker, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 888 days.

(21) Appl. No.: 13/001,992

(22) PCT Filed: Jun. 29, 2009

(86) PCT No.: PCT/US2009/049048
§ 371 (c)(1),
(2), (4) Date: Apr. 6, 2011

(87) PCT Pub. No.: WO2010/002784
PCT Pub. Date: Jan. 7, 2010

(65) Prior Publication Data
US 2011/0176050 A1    Jul. 21, 2011

Related U.S. Application Data

(60) Provisional application No. 61/077,329, filed on Jul. 1, 2008.

(51) Int. Cl.
*G02B 15/14* (2006.01)
*G02B 7/02* (2006.01)
*G02B 26/08* (2006.01)
*G02B 3/14* (2006.01)

(52) U.S. Cl.
CPC ............. *G02B 3/14* (2013.01); *G02B 26/0875* (2013.01)
USPC ........... 359/698; 359/694; 359/699; 359/823; 600/224

(58) Field of Classification Search
USPC ................. 359/698–702, 811, 813, 822, 823; 348/345, 360, E5.024, E5.045; 182/194, 223; 156/110.1, 413; 600/202, 210, 224
See application file for complete search history.

(56) References Cited

U.S. PATENT DOCUMENTS 8,091,602 B2 * 1/2012 Roberts et al. ............. 156/406.2
8,152,721 B2 * 4/2012 Michaeli et al. ............. 600/224

(Continued)

FOREIGN PATENT DOCUMENTS

WO    WO 2008/121845    10/2008
WO    WO 2008/131088    10/2008

OTHER PUBLICATIONS

International Preliminary Report on Patentability received for PCT/US2009/049048 mailed Jan. 13, 2011.

(Continued)

*Primary Examiner* — Loha Ben
(74) *Attorney, Agent, or Firm* — Michael Best & Friedrich LLP

(57) ABSTRACT

A flexible lens may be actuated to change its focal length by a deployable lens actuator. The lens actuator translates a rotational motion of an outer frame into a linear radial motion of a plurality of linear elements. The linear elements have fixed pins, which may be slidably coupled to cam pockets in the outer frame. The cam pockets have a gradually varying distance from the center of the outer frame. The rotation of the outer frame thus drives the cam pockets to slide about the pins, thereby causing radial motions of the linear elements. The linear elements stretch a flexible lens, thereby changing a curvature of the flexible lens.

22 Claims, 18 Drawing Sheets

(56) References Cited

U.S. PATENT DOCUMENTS

2002/0116059 A1     8/2002    Zadno-Azizi et al.
2005/0246019 A1    11/2005   Blake et al.
2006/0268227 A1    11/2006   Christie et al.

OTHER PUBLICATIONS

International Search Report and Written Opinion received for PCT/US2009/049048 mailed Jan. 28, 2010.

R. W. Boutte, "Design of a Micro-Camera Using a Silicon Based Closed-Loop Micro-Dep lovable Structure," Master's Thesis, University of Utah, and "Summit-V Five Level Surface Micromachining Technology Design Manual Version 3.0," Sandia National Laboratories, Accessed: http://mems.sandia.gov/samples/doc/SUMMIT_V_Dmanual_V3.0.pdf, Jan. 18, 2007, 32 pages.

Lee et al. "Thermal Actuated Solid Tunable Lens," IEEE Photonics Technology Letters, vol. 18, No. 21, pp. 2191-2193 (Nov. 1, 2006).

\* cited by examiner

LENS ACTUATOR

BACKGROUND OF INVENTION

1. Field of the Invention

This invention relates generally to actuators and systems incorporating same. More specifically, the invention relates to adaptive lens actuators and optical systems with variable focal lengths.

2. Description of Related Art

Adaptive lenses are used in cameras, confocal microscopes, and other optical systems. The focal length of a lens system may be changed by varying distances between multiple lenses that compose the lens system, or by changing the shape of a single flexible lens. Adaptive micro-lenses with a tunable focal length are particularly useful in micro-optical systems that find applications in sensing, communication, imaging, and display.

BRIEF SUMMARY OF THE INVENTION

In one aspect, a deployable device is provided. The deployable device may include a generally planar outer frame configured to rotate about a center point, and a plurality of linear elements configured to move radially relative to the center point as driven by the rotation of the outer frame. The outer frame may have one or more first grooves thereon, wherein the one or more first grooves have a gradually varying distance from the center point. The plurality of linear elements each may have one or more fixed pins slidably coupled to the one or more first grooves.

In another aspect, an artificial eye is provided having an aperture configured to control a light passage, and a microautofocus system configured to focus light from the aperture. The microautofocus system may include a flexible lens, a generally planar outer frame around the flexible lens and configured to rotate about a center point, and a plurality of linear elements configured to move radially relative to the center point as driven by the rotation of the outer frame. The outer frame may have one or more cam grooves thereon, and wherein the one or more grooves have a gradually varying distance from the center point. The plurality of linear elements each may have one or more fixed pins slidably coupled to the one or more grooves.

In another aspect, a method is provided including providing a generally planar outer frame having a plurality of first grooves thereon, wherein the outer frame is disposed around the flexible lens, providing a plurality of linear elements each having a fixed pin thereon, wherein the pins are slidably coupled to the first grooves, and wherein proximal ends of the plurality of linear elements are coupled to an outer edge of the flexible lens, and applying a tangential force to the outer frame while constraining a rotational motion of the linear elements thereby causing a relative sliding motion between the pins and the first grooves and driving the plurality of linear elements radially thereby changing a focus of a flexible lens.

In another aspect, a method is provided including disposing a lens carrier into an enclosure of a mold canister, evacuating an enclosure of the mold canister, injecting a lens material into the enclosure, and curing the lens material to form a flexible lens coupled to the lens carrier. The lens carrier may include a carrier ring, and a plurality of linear elements disposed radially about the carrier ring. The linear elements may have a plurality of attachment portions configured to couple to the flexible lens.

In another aspect, a lens actuator is provided including a generally planar outer frame configured to rotate about a center point, an electrostatic actuator configured to rotate the outer frame about the center point, and a plurality of linear elements configured to move radially relative to the center point as driven by the rotation of the outer frame. The outer frame may have one or more first grooves thereon. The one or more first grooves have a gradually varying distance from the center point, and the plurality of linear elements each may have one or more fixed pins slidably coupled to the one or more first grooves. The plurality of linear elements may be configured to be coupled to a flexible lens to change a shape of the flexible lens through the radial motion of the linear elements.

DETAILED DESCRIPTION

The invention may be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

Reference will now be made in detail to the present preferred aspects of the invention, examples of which are illustrated in the accompanying drawings. Wherever possible, the same reference numbers are used throughout the drawings to refer to the same or like parts.

In one embodiment, an adaptive lens is provided by varying a shape of a flexible lens material using a lens actuator. The flexible lens material may include a substantially transparent polymer material. The lens actuator has a deployable structure, which may be configured to translate a rotational motion of an outer frame into a radial motion of a plurality of linear elements, which move outwardly to pull (stretch) the lens material, thereby flattening the shape of the lens, or move inwardly to allow the lens material to relax, or push the lens material, thereby increasing a curvature of the lens. The expansion and contraction of an aperture formed by the linear elements, at least to some extent, may be reminiscent of the accommodation process of human eyes.

Figure 1:
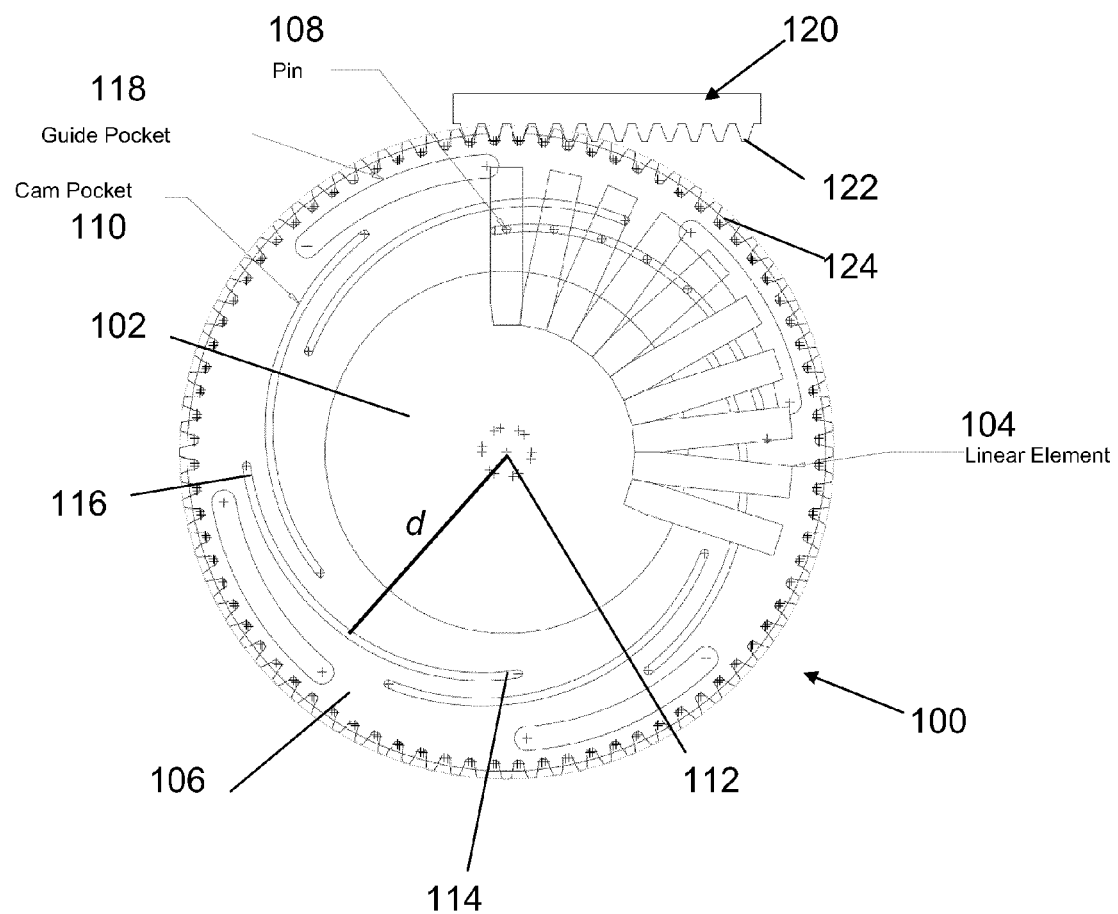
FIG. 1 is a schematic diagram illustrating an actuator in its retracted state.

FIG. 1 is a schematic diagram illustrating a lens actuator 100 in its "contracted" state, e.g., the lens 102 may be in a less flattened state as compared with a stretched or "flattened" state. The outer edge of the lens 102 may be coupled to a plurality of linear elements 104 (also referred to as radial expansion elements), and radial motions of the linear elements 104 cause the lens 102 to be stretched or relaxed. In the embodiment as shown, the radial motions of the linear elements 104 may be translated from rotational motions of an outer frame 106, which as shown is substantially circular in shape. A plurality of pins 108 may be fixedly coupled to the linear elements 104. The pins 108 may be coupled to one or more slots or grooves 110, referred to as cam pockets, on the outer frame 106, causing the pin to slide in the groove and guide the motion of the linear expansion elements 104. The cam pockets 110 have a distance d to the center 112 of the circular outer frame 106, and d gradually increases from a smaller distance to a larger distance when moving along from a first end 114 to a second end 116.

The outer frame 106 also has one or more slots or grooves 118, referred to as the guide slots or guide pockets, in which one or more guide pins (not shown) may be slidable. The guide pins may be fixedly coupled to a substrate, for example, thereby radially constraining the outer frame 106, but allowing the outer frame to rotate along the guide pockets. While the outer frame 106 is rotated, the cam pockets 110 force the pins 108 to slide along the cam pockets 110, thereby radially driving the linear elements 104 radially away from, or toward, the center 112. Thus, the rotational motion of the outer frame 106 is translated into the linear radial motions of the linear elements 104.

The rotational motion of the outer frame 106 may be caused, for example, by a linear actuator 120, which, as shown, has a plurality of gears 122 in operable communication with at least a portion of outer gear teeth 124 on an outer edge of the outer frame 106. The outer frame 106 including the outer gear teeth 124 may also be referred to as the "ring gear." The linear motion of the linear actuator 120 may then be translated into the rotational motion of the outer frame 106 through the coupled gears 122, 124.

Figure 2:
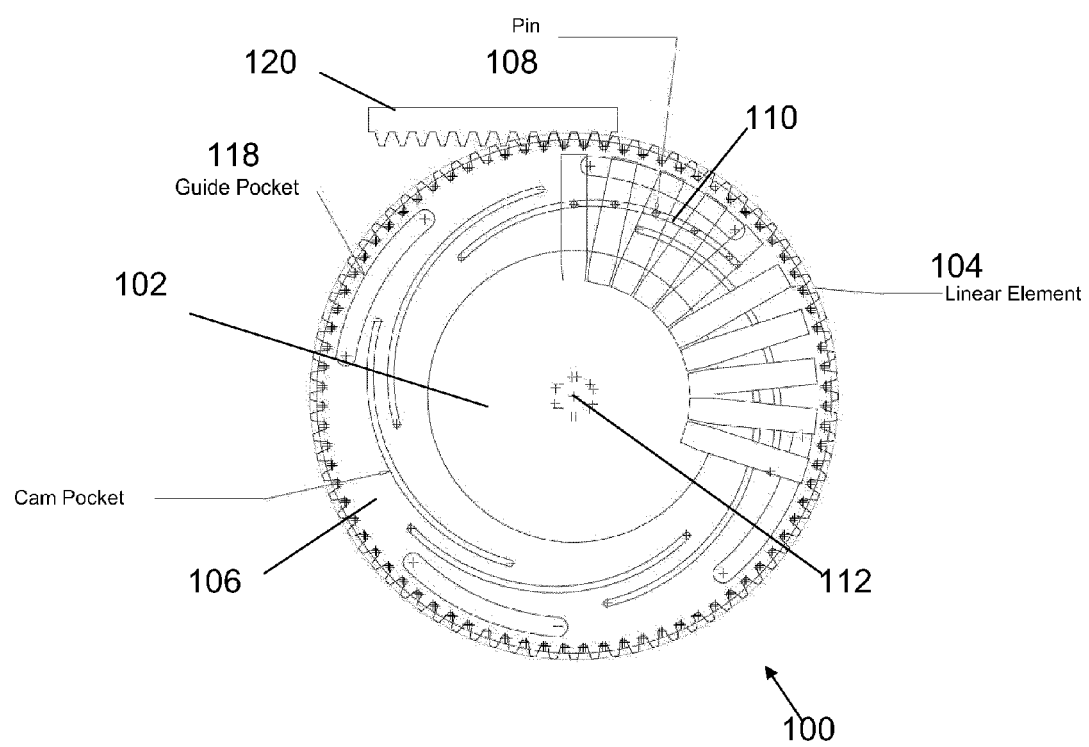
FIG. 2 is a schematic diagram illustrating the actuator of FIG. 1 in its expanded state.

FIG. 2 is a schematic diagram illustrating the actuator 100 in its "open," or expanded, state, e.g., the lens 102 may be stretched by the linear elements 104. This is achieved by, for example, moving the linear actuator 120 from right to left, thereby rotating the outer frame 106 in a counterclockwise direction. The guide pockets 118 constrain the outer frame 106, limiting its motion to rotational motion about the center 112. Other means may be possible to constrain the motion of the outer frame 106 to rotational motion only. For example, another linear actuator disposed on the bottom side of the outer frame opposing the linear actuator 120 may be used to constrain the motions of the outer frame without the need for the guide pockets 118.

The cam pockets 110 co-rotate with the outer frame 106, and slide about the pins 108. As described in detail below, the linear elements 104 may be constrained laterally, and thus may only have substantially linear motion, e.g., radial expansion or retraction. Thus, the cam pockets 110 slide about the pins 108, forcing the pins 108 together with their respective linear elements 104 to move radially outward, thereby pulling the outer edge of the lens 102 to stretch and flatten the lens 102.

Figure 3:
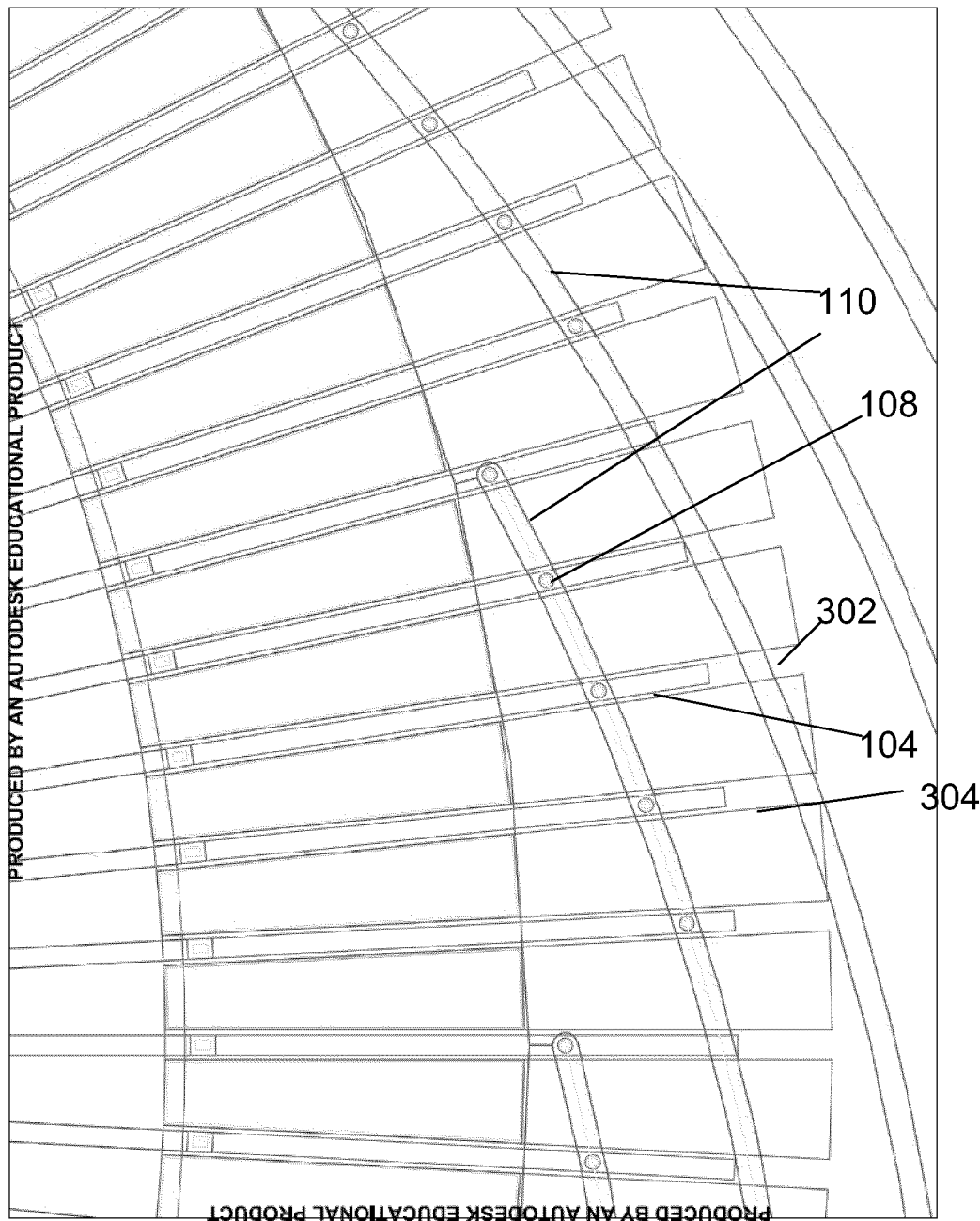
FIG. 3 is a schematic diagram illustrating details of an actuating mechanism for translating a rotational motion into a radial motion.
Figure 4A:
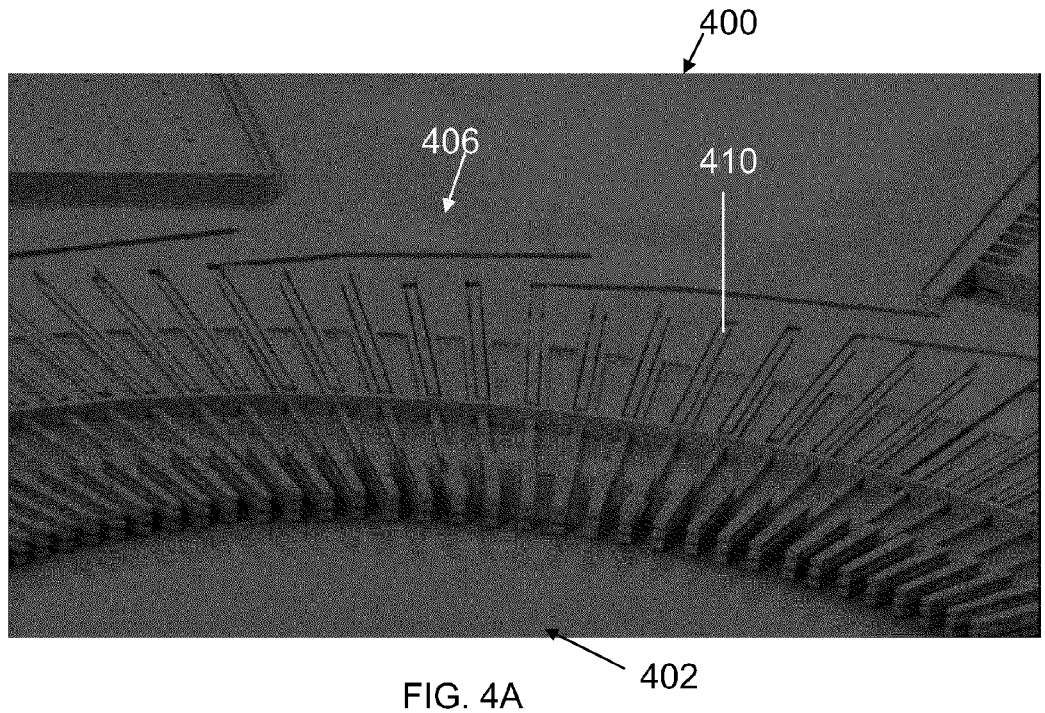
FIGS. 4A-4D are time-lapse images of an actuator during deployment showing the opening of a center aperture.
Figure 4B:
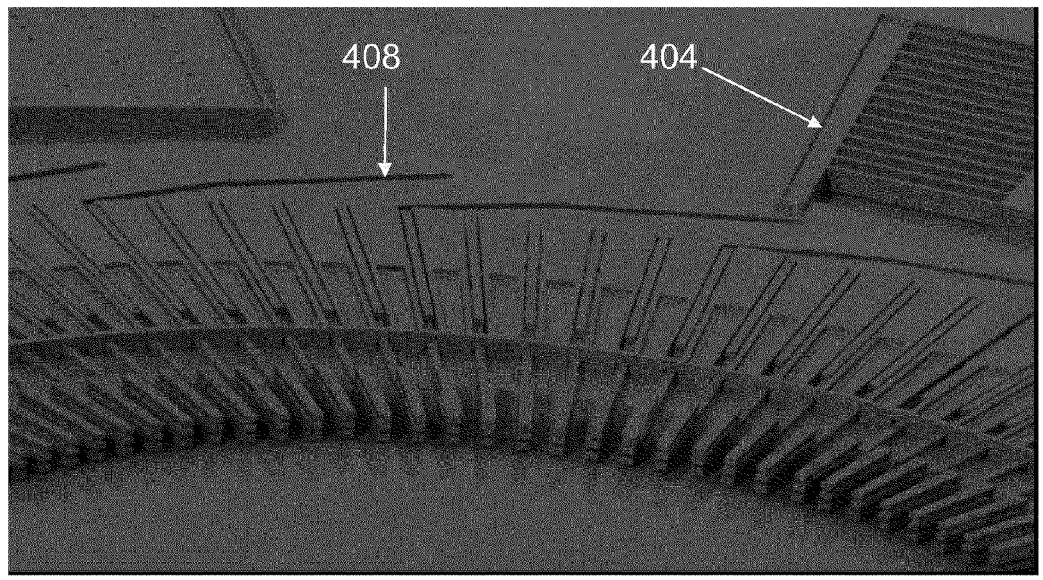
Figure 4C:
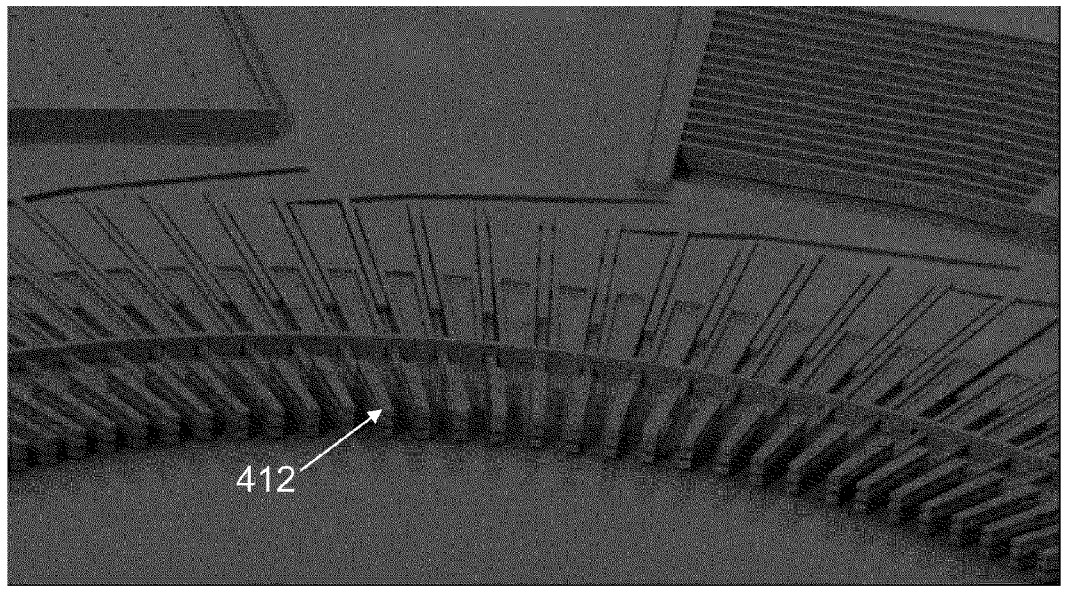
Figure 4D:
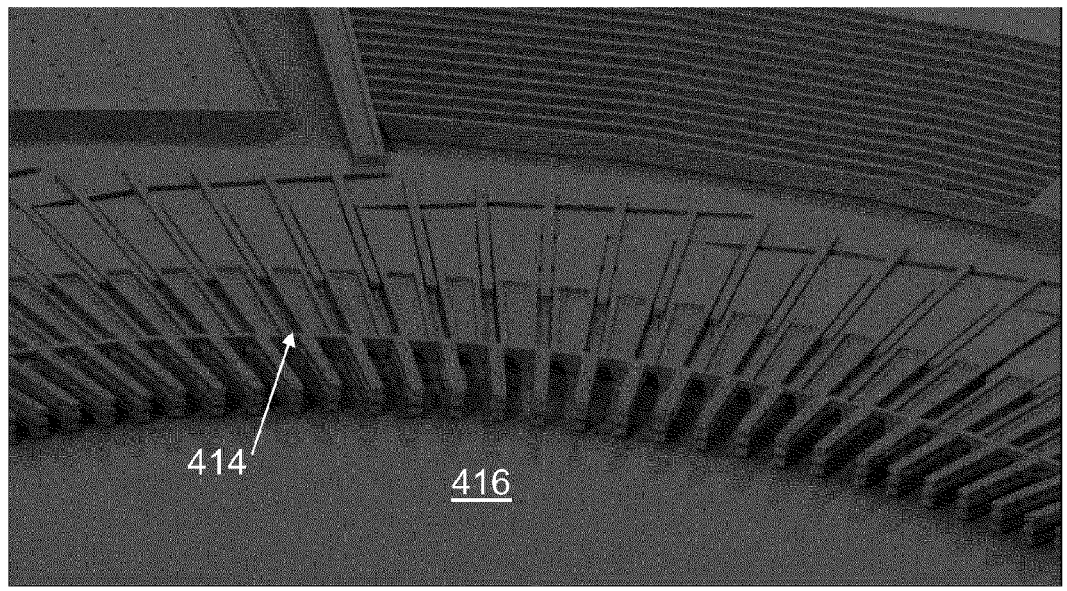

FIG. 3 is a schematic diagram illustrating details of the actuating mechanism for translating a rotational motion into a radial motion. As shown, the linear elements 104 may be constrained within radial trenches 302 formed in a substrate 304. Thus, when the cam pockets 110 slide about the pins 108, the linear elements 104 cannot co-rotate with the cam pockets 110, and can only move radially along the trenches 302.

In a preferred embodiment, a lens actuator may be manufactured using microelectromechanical system (MEMS) technologies, such that the resulting lens actuator has a miniature size and can be applied to microscopic systems, such as a microcamera.

Many standard MEMS and integrated circuit (IC) fabrication processes can also be used to produce a miniature lens actuator. An exemplary process for fabricating the devices uses chemical deposition, photolithographic patterning, and both dry and wet etching to create MEMS devices. The device can use extensive planarization, which can allow for clean, reliable devices. The processing may use, for example, the Sandia National Laboratories ultra-planar multi-level MEMS technology (the SUMMiT-VTM process; see, e.g., PCT/US2008/058705, PCT/US2008/060608, R. W. Boutte, "Design of a Micro-Camera Using a Silicon Based Closed-Loop Micro-Deployable Structure," Master's Thesis, University of Utah, and "Summit-V Five Level Surface Micromachining Technology Design Manual Version 3.0." *Sandia National Laboratories*, https://mems.sandia.gov/samples/doc/SUMMiT_V_Dmanual_V3.0.pdf; the disclosures of which are hereby incorporated by reference in their entirety) which utilizes five polycrystalline silicon (polysilicon) layers, including an electrical interconnect layer and four mechanical layers.

FIGS. 4A-4D are time-lapse images of a MEMS actuator 400 during deployment showing the opening of a center aperture 402. As shown, a linear actuator 404 drives the outer frame 406 to rotate counterclockwise. The cam pockets 408 slide about pins (not shown) fixed to the linear elements 410, forcing the linear elements 410 to move radially outwardly, opening up the aperture 402.

Some or all of the plurality of linear elements 410 have lens attachment portions 412 at the proximal (relative to the center aperture 402) end. The lens attachment portions 412 may also serve as a stop to restrain how far out the linear elements 410 can travel when coming into contact with an elevated ring portion 414 disposed on the substrate 416. The lens is not shown in FIGS. 4A-4D.

Figure 5:
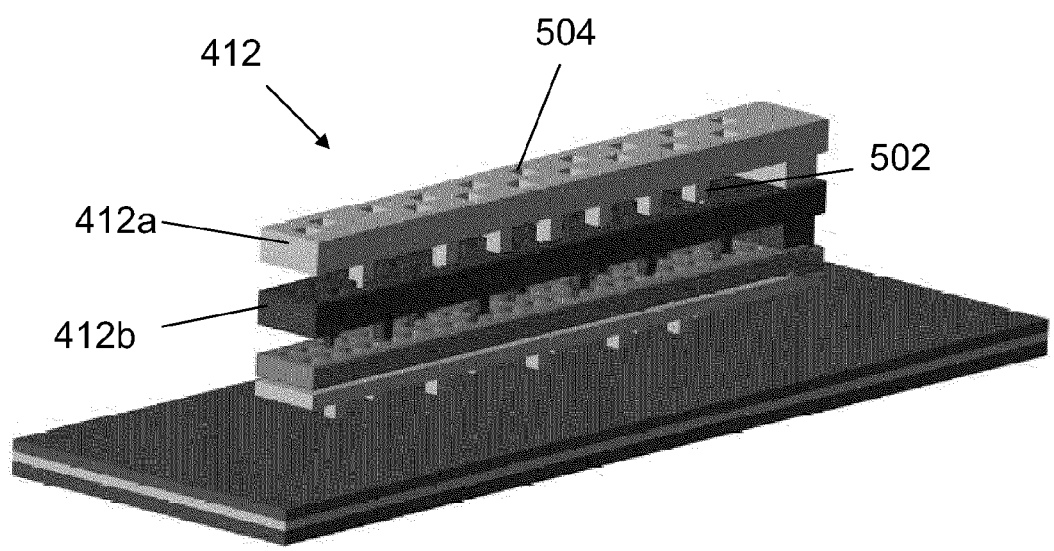
FIG. 5 is a perspective view of a lens attachment portion of the actuator.

FIG. 5 is a perspective view of a lens attachment portion 412 of the actuator 400. As shown, the lens attachment portion 412 comprises a plurality of layers 412a, 412b, . . . . A plurality of support structures 502, referred to as "dimples," may be formed between the layers 412a, 412b to prevent the layers from collapsing, and to add surface area to the attachment interface between grippers and lens materials. The lens attachment portion 412 may be configured to be coupled to the flexible lens material (not shown) at the multiple surfaces of the plurality of layers. A plurality of indentations 504 may be formed on each layer to further increase the surface area that may be in contact with the lens material, and serve as coupling points that "grab" the lens material. Advantageously, the lens attachment portion 412 can tightly grab the lens material without detachment during the expansion and contraction of the lens, and prevents distortion and tearing of the lens.

Preferably a large number of linear elements including attachment portions may be used to uniformly distribute the force around the edge of the lens, thereby avoiding buckling and warping of the lens material, and consequently avoiding lens aberrations. In an embodiment, a total number of 20 or more linear elements may be used. In a preferred embodiment, the number of linear elements may be in the range of 36-60 in a MEMS realization.

Figure 6:
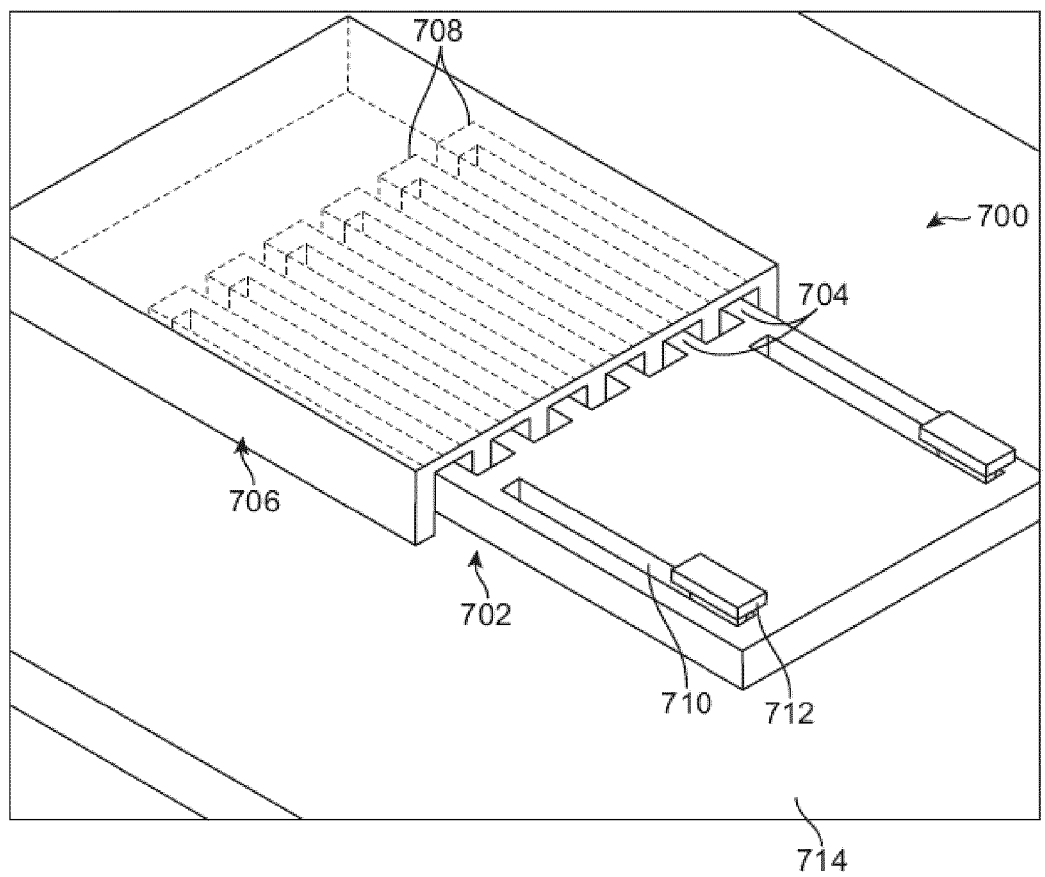
FIG. 6 is a schematic diagram illustrating an actuation mechanism for realizing a linear motion that can be applied to the lens actuator.

FIG. 6 is a schematic diagram illustrating an actuation mechanism for realizing a linear motion that can be applied to the linear actuator 404 of the lens actuator 400. The actuation may be accomplished using an electrostatic (repulsion) charge injection comb drive. As shown, the MEMS comb drive 700 includes a first element 702 having a plurality of extrusions 704. In the position as shown, a plurality of extrusions or fingers 704 of the first element 702 may be substantially enclosed in respective retentions 708 of the second element 706. The first element 702 may be slidably coupled to the substrate 714 through the slots 710 and the vertical members 712 fixedly coupled to the substrate 714. By electrically charging one or both of the first and second members 702, 706 using non-contact means, such as an energy field as described in PCT/US2008/060608, the disclosure of which is hereby incorporated by reference in its entirety, or using contact means such as conductive electrical charge paths to discharge a capacitor, the first member 702 may be actuated telescopically relative to the second member 706.

In one embodiment, a temporary "carrier ring" is used to hold the lens material and the linear elements together during molding operation and transport. The assembly of the carrier ring, the linear elements, and the attachment portions collectively may be referred to as a "lens carrier" which maintains the integrity of the lens in the molding operation, and during the transport and storage of the lens. The lens carrier may be disposed onto a substrate after the lens molding. The outer frame may then be attached to the lens carrier assembly, and the pins and the grooves are aligned. The carrier ring may then be removed so that the linear elements can move radially.

The lens carrier may be configured to fit into a mold canister that enables the polydimethylsiloxane (PDMS) or other flexible optical material to flow into the lens mold and around the lens attachment portions by a vacuum suction coupled with pressure injection. The mold canister also allows the lens actuator to be cleaned and the extraneous material around the edge of the lens to be trimmed. The mold canister allows the modable lens material to be injected under pressure, e.g., using a syringe and needle. The PDMS may be pre-degassed in the syringe such that the bubble-free material enters the mold. This improves the optical quality of the lens. The mold chamber may be held under a partial vacuum, e.g., 10-100 torr so that the lens material flows into and fills mold cavities, and may be coupled with various surface areas of the lens attachment portions.

Figure 7:
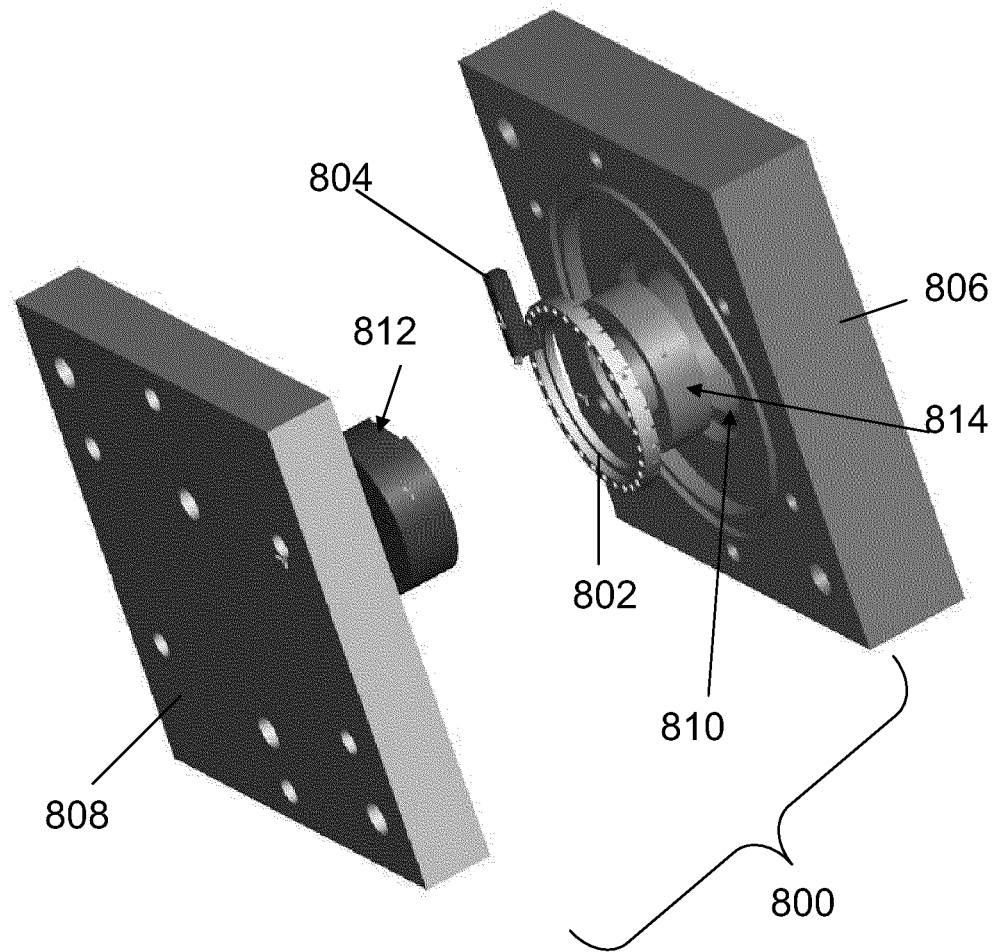
FIG. 7 is an exploded view of a lens molding canister for molding a lens onto a lens carrier.

FIG. 7 is an exploded view of a lens molding canister 800 for molding a lens onto a carrier ring 802 and a plurality of linear elements 804 (only one is shown). The lens molding canister 800 comprises a first plate 806 and a second plate 808, which form a cavity 810 therebetween when they come into contact with each other. One or more lens molds 812, 814 may be fitted into the cavity 810.

Figure 8:
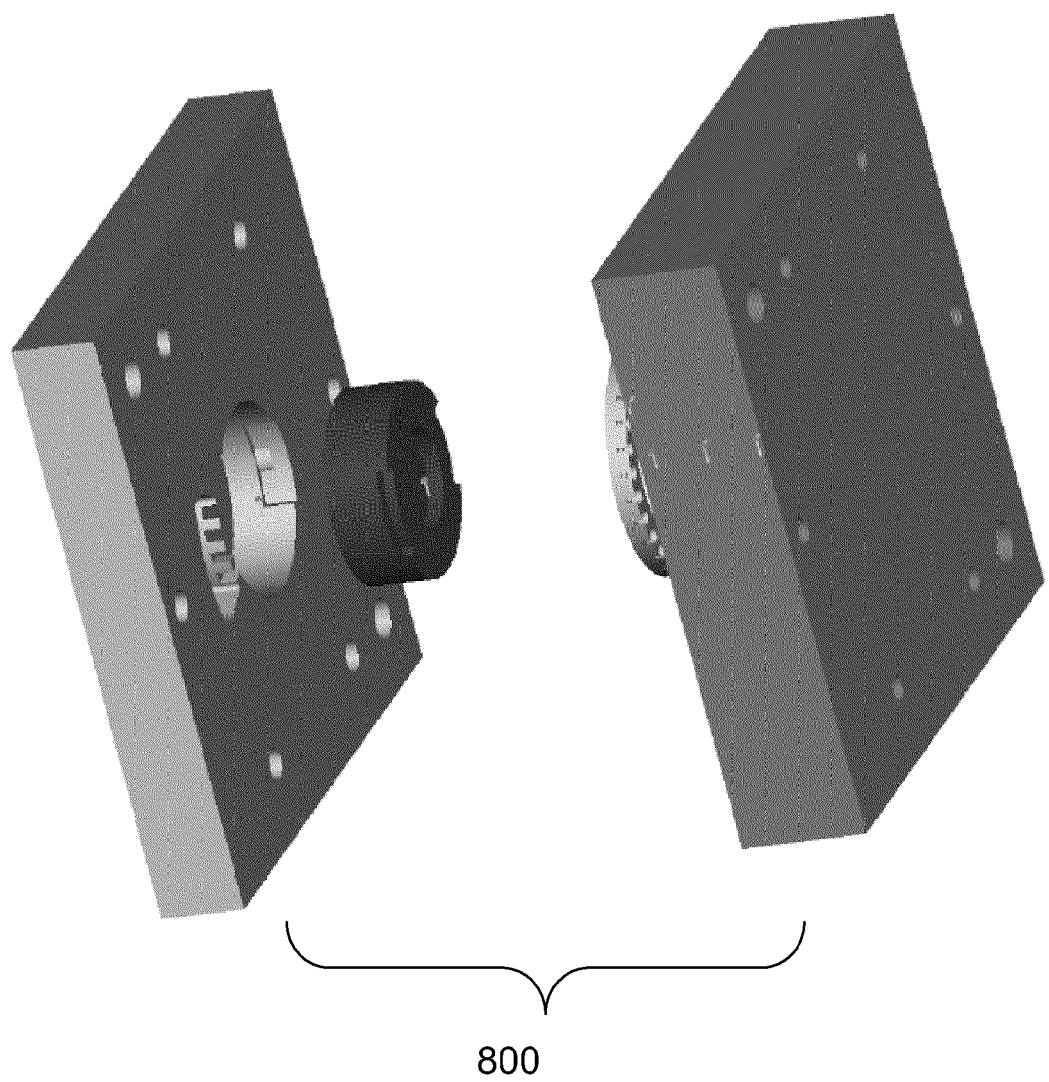
FIG. 8 is an exploded view of the lens molding canister of FIG. 7 from a different angle.

FIG. 8 is an exploded view of the lens molding canister 800 when viewed from a different angle.

Figure 9:
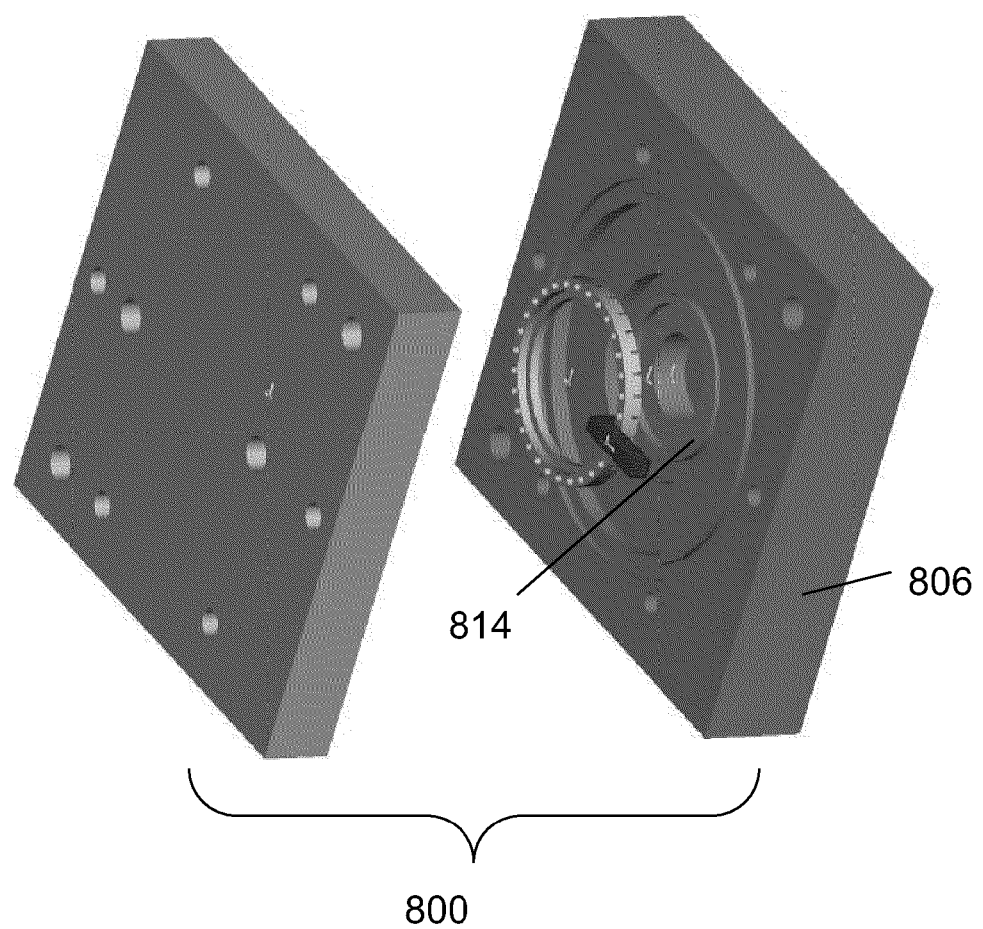
FIG. 9 is an exploded view of a partially assembled lens molding canister with a lens mold in place.

FIG. 9 is an exploded view of the partially assembled lens molding canister 800 with a lens mold 814 fitted into an indentation of the first plate 806.

Figure 10:
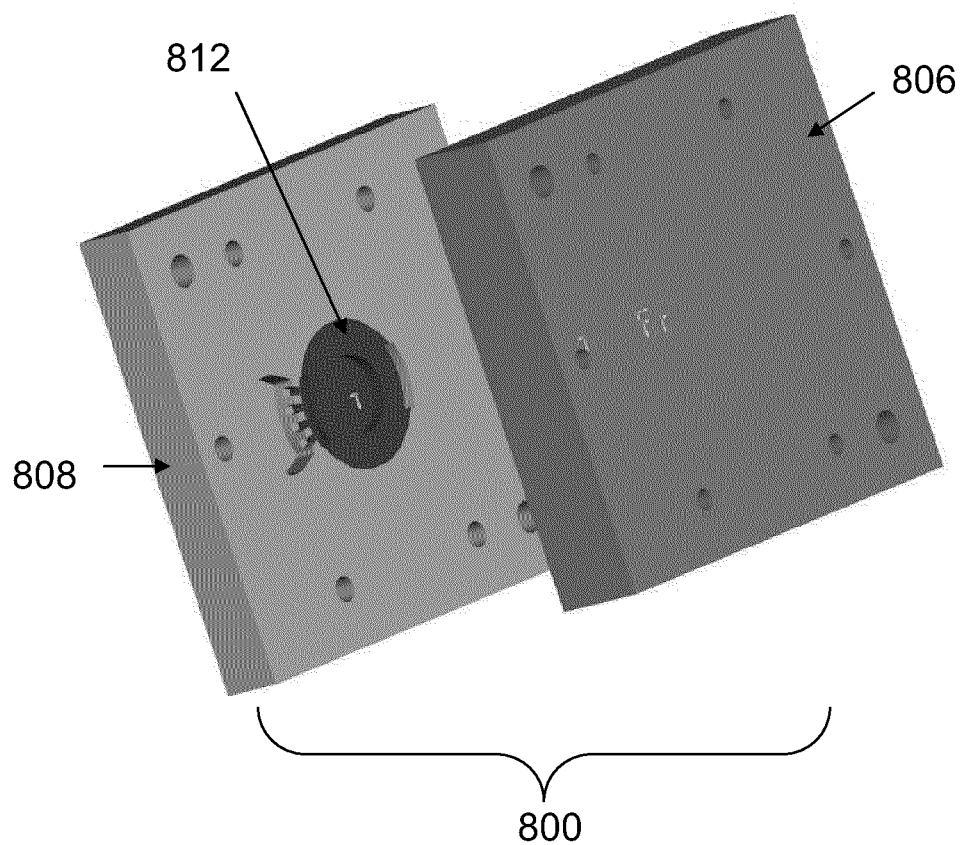
FIG. 10 is an exploded view of the partially assembled lens molding canister of FIG. 9 when viewed from a different angle.

FIG. 10 is an exploded view of the partially assembled lens molding canister 800 when viewed from a different angle, showing another lens mold 812 fitted into an indentation of the second plate 808.

Figure 11:
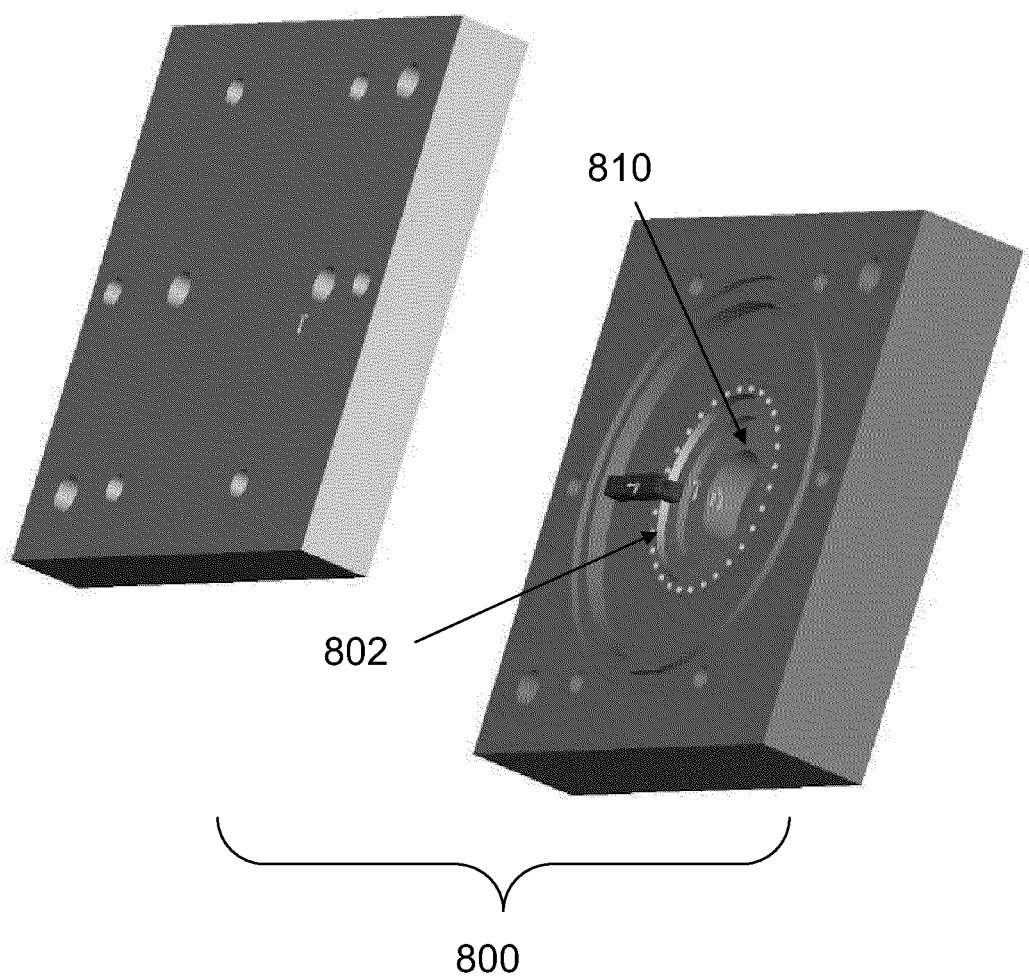
FIG. 11 is an exploded view of a partially assembled lens molding canister with a carrier ring in place.

FIG. 11 is an exploded view of the partially assembled lens molding canister 800 with the carrier ring 802 fitted into a stepped recess 810 around the lens mold 814.

Figure 12:
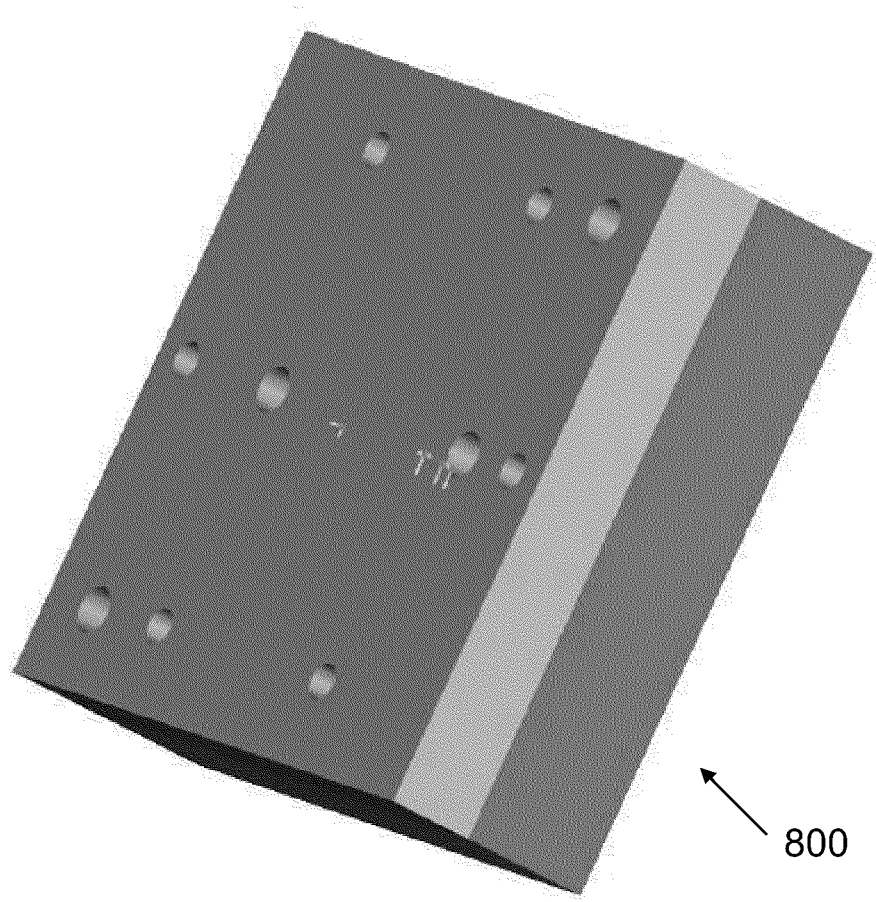
FIG. 12 is a perspective view of the assembled lens molding canister of FIG. 11.

FIG. 12 is a perspective view of the assembled lens molding canister 800. Once fully assembled, the lens molding canister 800 may be evacuated to form a vacuum in the cavity therein. PDMS material may then be injected into the cavity formed by the lens molds 812, 814. The PDMS material may then be cured in place, thereby setting the final lens geometry. The carrier ring 802 together with the lens may then be removed from the lens molding canister 800, and may be placed onto an actuator substrate. After the other components such as the ring gears of the lens actuator are fabricated on the substrate, the carrier ring 802 may be removed, leaving the complete lens actuator coupled with the lens.

Figure 13A:
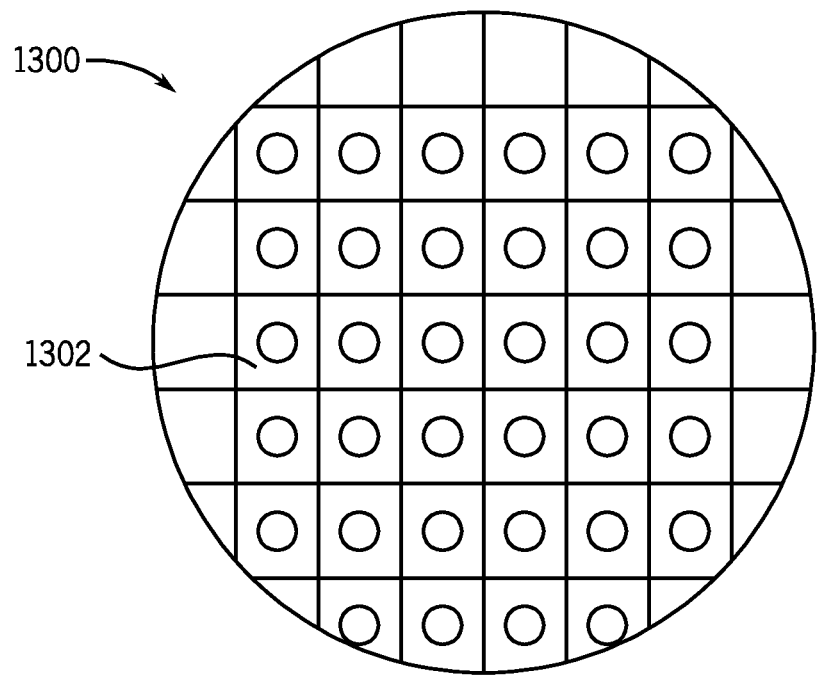
FIG. 13A is a schematic diagram of a method for manufacturing a large number of lenses.

FIG. 13A is a schematic diagram illustrating a method for manufacturing a large number of MEMS lenses with their respective actuators. A patterned wafer 1300 with individual micro-actuator dices 1302 may be prepared. The wafer 1300 may be processed, for example, by including backside bulk machining of light paths using standard etching methods, such as the KOH etching, followed by a release etch.

Using a dispenser, precise picoliter quantities of PDMS may be printed and wetted around the attachment portions, which as realized in MEMS technologies may be tiny polysilicon micromachined grippers. These volume- and temperature-controlled deposits may create a reproducible lens shape. For example, a higher temperature may result in more beaded-up droplets due to faster curing and setting. The precision deposits can then be characterized for their optical properties. Precision dispensing may be accomplished through such means as micropipeting or through precision bubblejet or inkjet molding wherein a PDMS bubble or droplet is allowed to "wet" the gripper surface. The surface tension of the wetting action then pulls the bubble from the injector to the gripper surfaces. Equilibrium surface tension (as a function of initial bubble volume and temperature) results in a reproducible lens shape.

Figure 13B:
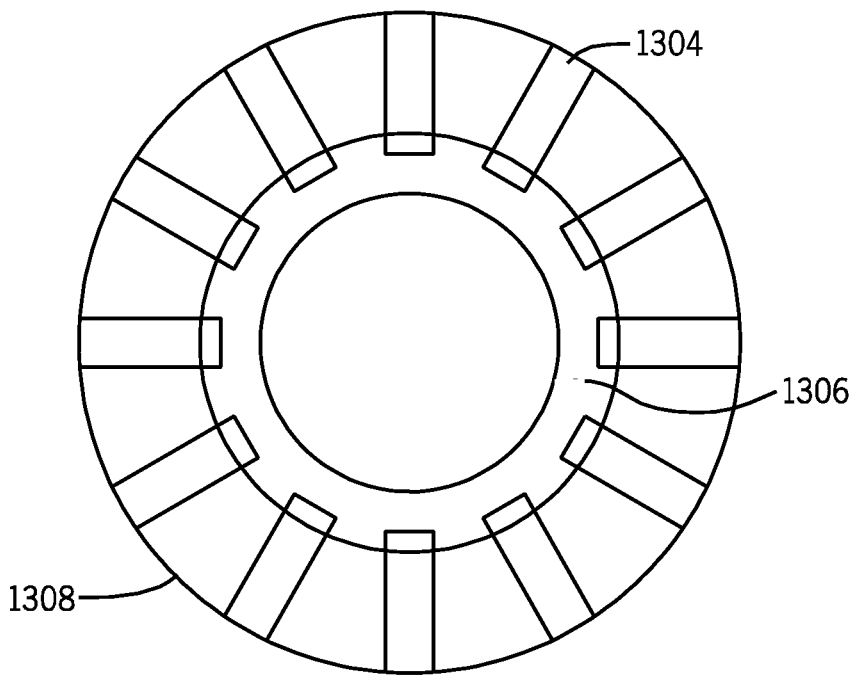
FIG. 13B is a schematic diagram illustrating the injection molding of a Polydimethylsiloxane (PDMS) lens with a number of attachment points.

FIG. 13B is a schematic diagram illustrating an injection molding of a PDMS lens with a number of attachment portions. A precision picoliter metering system may be used to inject a reproducible droplet of PDMS inside each individual lens molding canister or into individual holes prepared on the substrate. Surface tension wicks the PDMS in and around the stacked polysilicon attachment portions 1304 of the linear elements. The polysilicon attachment portions 1304 may be coated with photoresist to pattern the edge of the lens, thereby preventing lens material from coating the interior surfaces between the linear expansion elements.

Initially, the droplet has a smaller radius 1306 adjacent the proximal ends of the attachment portions 1304. The droplet flattens and the radius increases to a final radius 1308 which defines the size of the lens. The polysilicon attachment portions 1304 may resemble the biomimetic gripper "cilia." Although in the embodiment shown in FIG. 13B the attachment portions 1304 are substantially uniformly arranged around the lens in a circular pattern, some of the attachment portions and the linear elements may be coupled to the lens at different distances from the center of the lens. For example, it may be possible by design to arrange some of the "cilia" to be further inside the edge of the lens, which pull slower and to less total displacement, as compared to cilia attached further out on the lens. This may be accomplished by mechanical arrangement of the linear elements with respect to the pin-in-groove, with a more aggressive pulling angle of the slot.

Viscosity, temperature, bubble volume, and other parameters control the shape of the viscous liquid lens material which, when cured, forms the flexible lens. A fabrication process that may be adapted to produce the lenses is described in Lee et al., "Thermal Actuated Solid Tunable Lens," IEEE Photonics Technology Letters, vol. 18, no. 21, pp. 2191-2193 (Nov. 1, 2006), the disclosure of which is hereby incorporated by reference in its entirety.

In one embodiment, a needle may be used to inject the PDMS into a cavity from an injection system by placing a bubble from a micro needle tip in contact with the linear elements. Alternatively, inkjet or bubble jet technologies may be employed to precisely inject micro droplets onto the patterns or cavities.

The basic structures and deploying mechanisms of the actuator device discussed above can be employed in many applications. In the following, an exemplary implementation of micro-deployable devices in an artificial eye is described.

A microautofocus mechanism may allow for a single flexible lens to be stretched continuously depending on focal length requirements. This type of mechanism has the potential of addressing challenges in designing artificial eyes as well as digital camera, such as the miniaturization and digital image quality issues, thus opening up many new opportunities.

As discussed above, relatively small input actuation from the outer frame of the actuator can result in large internal displacement. Similarly, a human eye, through a process known as accommodation, manipulates the focal length projection on the retina by flattening or thickening the lens which is sometimes referred to as the crystalline lens. During accommodation, ciliary muscles (connected to the lens with Zonnules of Zinn) move outwardly to apply a force on the lens, causing the lens to elongate, thereby reducing its optical power.

A microautofocus mechanism takes advantage of the radial movement of the actuator structures described earlier to elongate a preformed, yet compliant, flexible lens. The flexible lens may be composed, for example, of polymers. A relatively large number of linear elements described above allows for a large surface area and a large number of coupling points to be in contact with the lens polymer, thereby reducing unwanted lens warping, which leads to optical aberrations. PDMS is one exemplary material that is suitable as a lens material in the microautofocus lens actuator, although many other materials may also be suitable.

To ensure proper exposure of images taken with an artificial eye or small/portable cameras, a microaperture (iris) is preferably coupled to the microautofocus mechanism. Currently, small consumer device image sensors use a software algorithm to adjust the light on a CMOS (complimentary metal oxide semiconductor) image sensor. However, "software-only" light adjustment may be inadequate during high and low lighting conditions. Hence, an improved mechanical iris diaphragm may be needed.

Design modifications to deployable structures, such as the actuator described above and those described in PCT/US2008/058705, the disclosure of which is hereby incorporated by reference in its entirety, allow for the mechanism to be transformed into a pupil diameter control system resembling the iris of the human eye. When light enters the eye, brain signals tell the iris to expand/contract as needed to prevent damage to the sensitive retina. As the iris expands and contracts, ciliary muscle fibers act to adjust the lens to allow proper focus under the specific lighting conditions. The crystalline lens and the pupil work in concert to produce a properly exposed and focused image on the retina.

Thus, one aspect of the present invention provides a MEMS device with the ability to stretch a flexible lens (similar to a crystalline lens of the human eye), which has far-reaching consequences in the miniaturization of optical systems. In this aspect of the invention, the micro-deployable devices may provide two key components in an artificial eye: a microautofocus mechanism and a microaperture. The microautofocus component couples a lens, preferably a flexible polymer lens, to the lens actuator; as it deploys open, it stretches the polymer lens radially (e.g., at a number of fixed areas or coupling points around the circumference of the lens). The lens deformation in turn causes a focal plane change. The ability to change the focal plane may also be advantageous to portable digital imaging devices such as the cell phone camera and the mini-digital camera.

Figure 14:
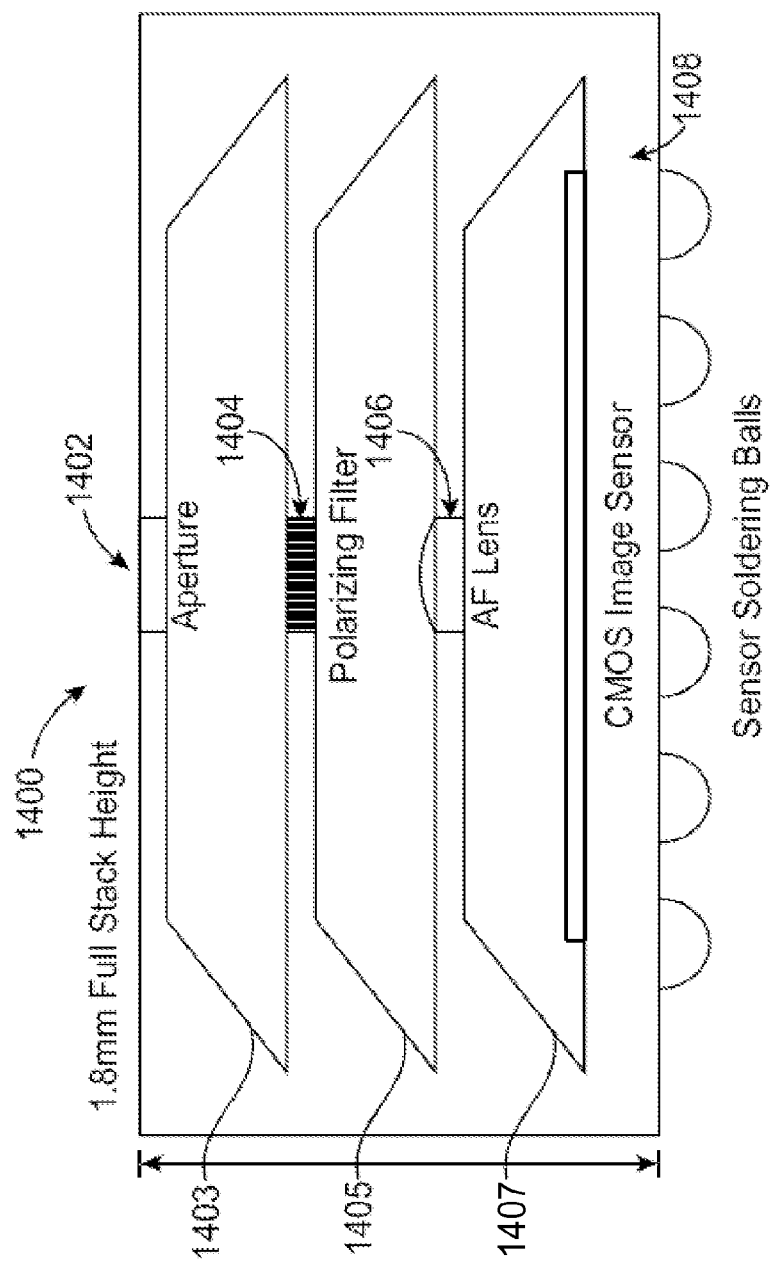
FIG. 14 is a schematic diagram of a stacked microcamera system including a micro-lens and actuator.

FIG. 14 is a schematic diagram of an artificial eye 1400 in accordance with this embodiment of the invention. A microcamera can use the same architecture. In this embodiment, the artificial eye 1400 comprises a microaperture 1402, a microscale polarizing filter 1404, and an auto focus (AF) lens together with its actuator 1406, all optically coupled to a CMOS image sensor 1408. The components may be fabricated on stacked dies 1403, 1405, 1407, and may be bonded together to form microcamera 1400 using wafer bonding technologies. The microaperture 1402 may comprise microplates to block light as described in PCT/US2008/058705, or employs the deployable structure similar to those disclosed in the present application with the linear elements functioning as light blocker.

As shown in FIG. 14, the artificial eye 1400 may have dimensions of about 1.8 mm×2.0 mm×2.0 mm. The microaperture may have a pupil diameter in the range of, for example, 480-961 μm, or f/5.6-f/2.8. Those of ordinary skill in the art will recognize that other sizes and different f-stop ranges are possible.

As light enters the microaperture (pupil), its intensity may be adjusted to proper levels onto the PDMS lens (crystalline lens). Microautofocus lens actuator (ciliary muscles) connected to the crystalline lens, with attachment portions (Zonnules of Zinn), contract thereby distorting the lens to bring the image into focus on the CMOS image sensor (retina). As the image plane changes, the microautofocus lens actuator (MAFLA) opens, stretches the PDMS lens, and adjusts the focal plane. Focal plane changes often require the amount of light on the image plane to be adjusted as well, so the MAFLA and the microaperture desirably work in concert to produce a high quality image.

"Accommodation" within the eye enables focal length adjustments based on dynamic imaging situations. For example, a person can be reading a book and then look up to see someone walking across the room, immediately attaining focus. Fixed-focal-length cameras do not deal with moving images well nor can they handle lighting conditions outside of software-adapted ranges. The microcamera may handle both dynamic images and the changing of lighting conditions while producing a higher quality image.

In accordance with an embodiment of the invention, individual components of an artificial eye or a microcamera may be fabricated on a plurality of semiconductor dies, and the dies may be wafer-bonded together to form a microcamera system.

Figure 15A:
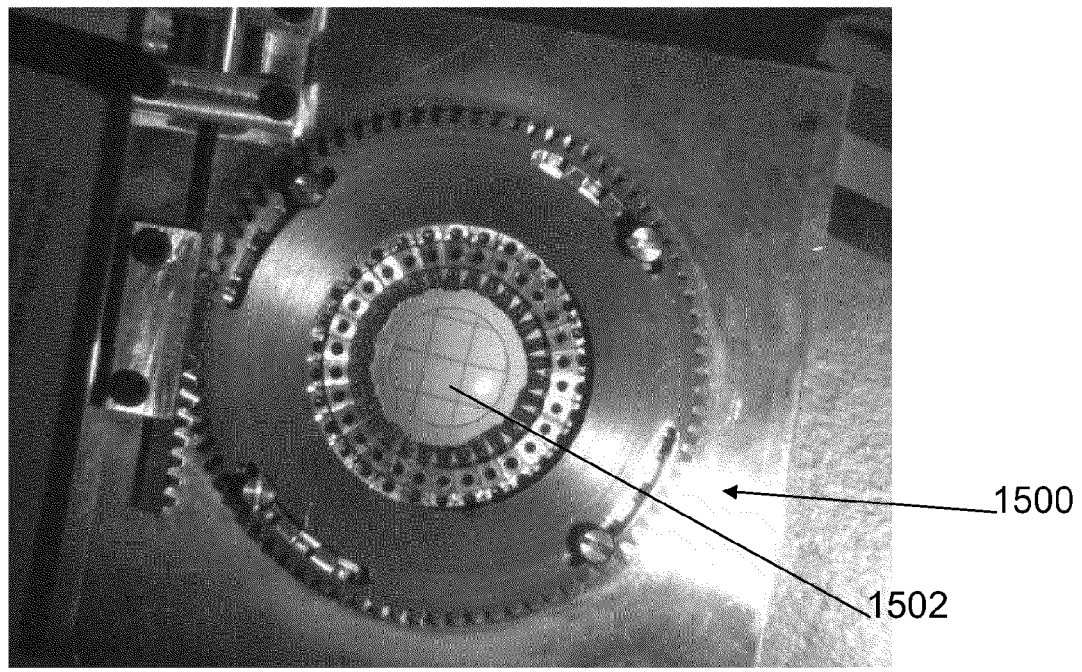
FIG. 15A is a photograph of a macroscopic lens with its actuator in a retracted state.
Figure 15B:
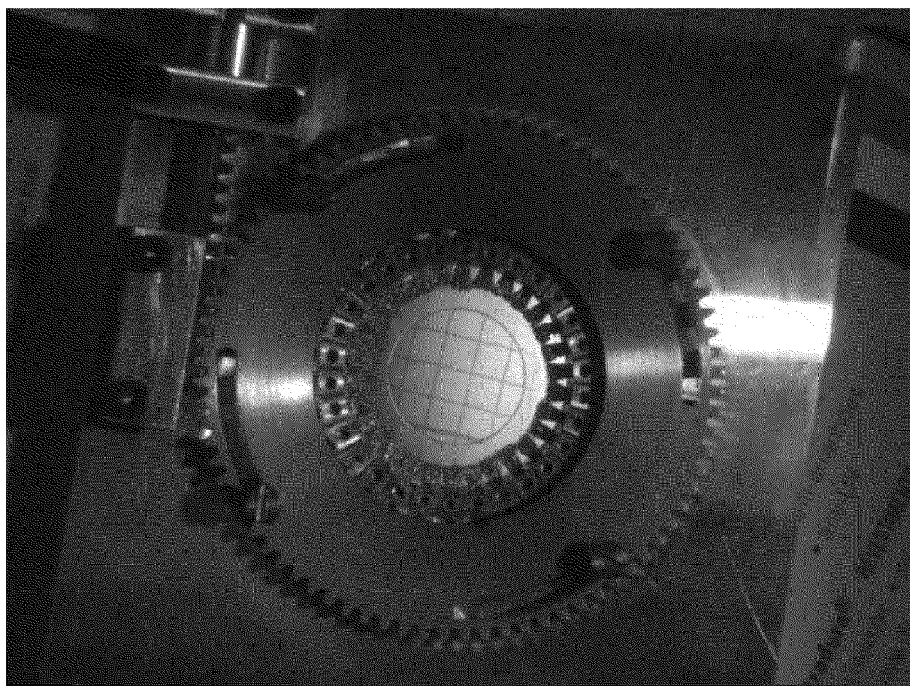
FIG. 15B is a photograph of the macroscopic lens with its actuator in an expanded state.

FIG. 15A is a photograph of a macroscopic lens actuator 1500 in a "retracted" state. The lens 1502 is in a less stretched, or relaxed state. The resulting larger curvature of the lens leads to a smaller focal length, thereby magnifying the background grid pattern more than when the lens 1502 is more stretched or flattened, as shown in FIG. 15B, where the actuator 1500 in an expanded state. The macroscopic lens actuator 1500 to some extent is similar to the MEMS actuator 400 described earlier. The lens attachment may be achieved, however, using a plurality of twisted, woven or braided copper wires to increase the number of attachment points and the total surface area of coupling.

Figure 16:
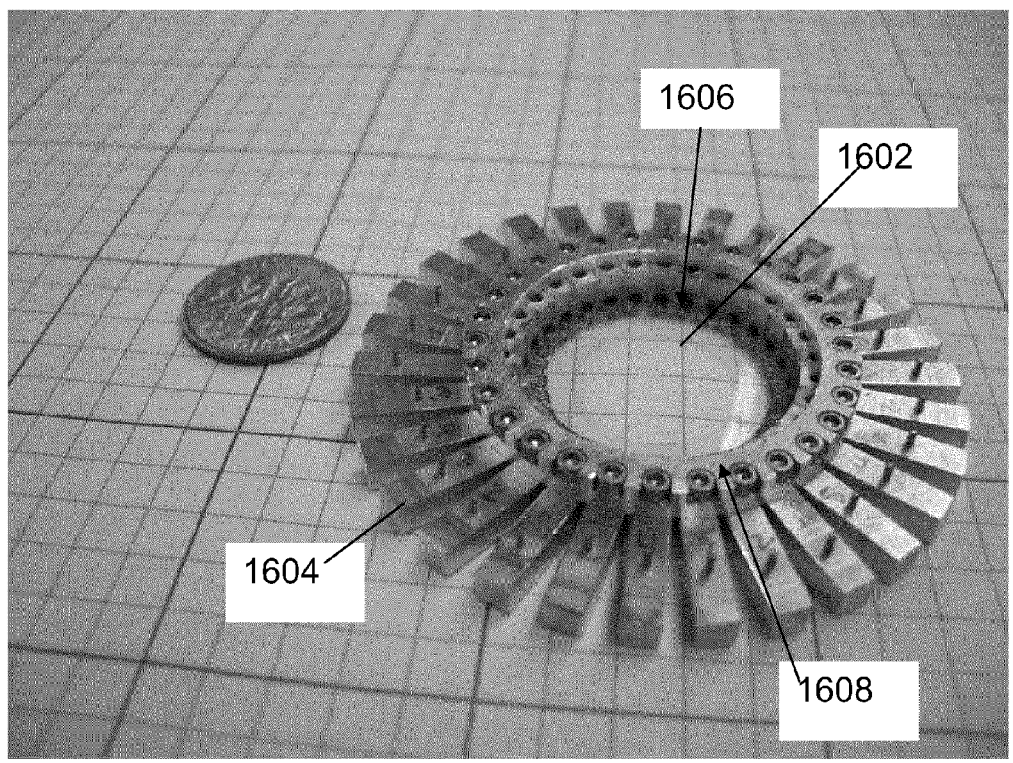
FIG. 16 is a photograph of a macroscopic lens attached to radial expansion linear elements.

FIG. 16 is a photograph of a macroscopic lens 1602 attached to a plurality of linear elements 1604 through braided copper wires 1606. The carrier ring 1608 is not yet removed. A dime coin is used to illustrate the relative size of the lens and the linear elements.

Figure 17A:
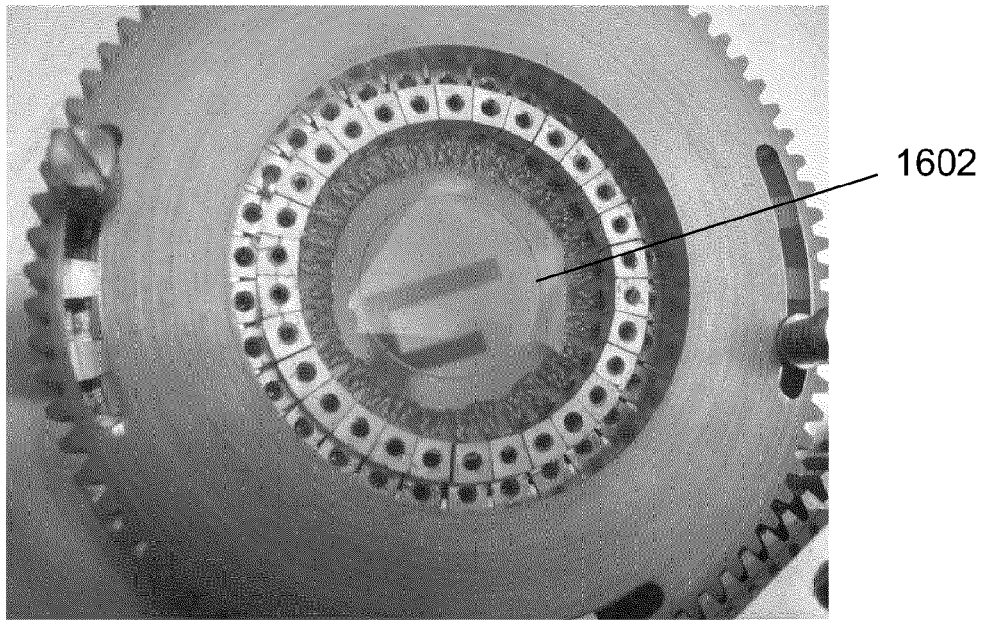
FIGS. 17A and 17B are photographs of a macroscopic lens being actuated to different focal lengths.
Figure 17B:
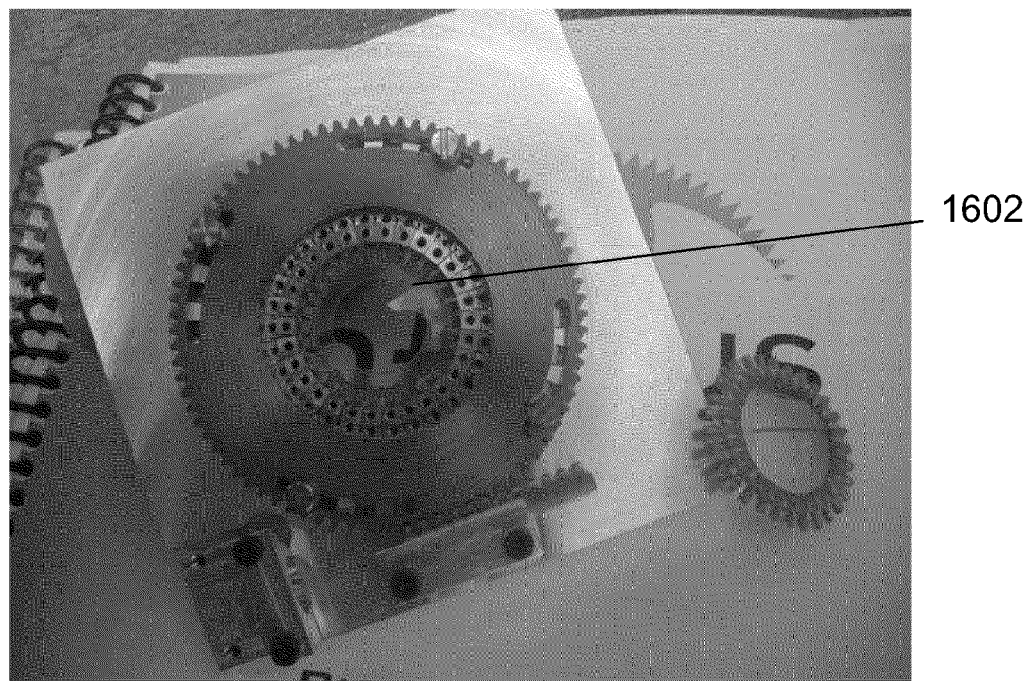

FIGS. 17A and 17B are photographs of the macroscopic lens 1602 at different focal lengths. In FIG. 17A, the lens 1602 is out of focus, and the characters behind the lens are blurred. In FIG. 17B, the lens 1602 is focused, producing sharp images of the characters. The lens at the side of the actuator in FIG. 17B was removed from the actuator, so this view shows the lens with the braided copper attachment points but no carrier ring or the linear elements.

The actuator, and the auto focus mechanism in particular, provided by embodiments of the invention may be used in digital cameras including cell phone cameras, and in hyperthermic antenna, micro-valves, micro-heaters, replacement for balloon angioplasty, etc. The deployable structures used to realize the actuator may also be versatile in a variety of macro-scale environments, such as aerospace, satellites, robotics, and retractable stadium coverings, as well as in micro-scale environments using MEMS technologies.

While the invention has been described with respect to a limited number of embodiments, those skilled in the art, having benefit of this disclosure, will appreciate that other embodiments can be advised and achieved which do not depart from the scope of the invention as disclosed herein. Accordingly, the scope of the invention should be limited only by the attached claims.

What is claimed is:

1. A deployable device, comprising:
a generally planar outer frame configured to rotate about a center point;
a plurality of linear elements configured to move radially relative to the center point as driven by the rotation of the outer frame; and
a plurality of attachment portions coupled to proximal ends of the linear elements, wherein the attachment portions are configured to be coupled to a flexible lens material,
wherein the outer frame has one or more first grooves thereon, wherein the one or more first grooves have a gradually varying distance from the center point, and
wherein the plurality of linear elements each have one or more fixed pins slidably coupled to one of the one or more first grooves.

2. The deployable device of claim 1, wherein the outer frame further has one or more second grooves thereon for constraining a motion of the outer frame to a substantially rotational motion.

3. The deployable device of claim 1, further comprising a linear actuator configured to rotate the outer frame.

4. The deployable device of claim 3, wherein the outer frame has a plurality of outer gear teeth on an outer surface of the outer frame.

5. The deployable device of claim 4, wherein the linear actuator comprises a drive gear in operable communication with at least a portion of the outer gear teeth.

6. The deployable device of claim 5, wherein the drive gear is configured to transfer a tangential force to the outer frame thereby rotating the outer frame, whereby the force is translated to the first grooves and is configured to slide the first grooves about the pins, and wherein the movement of the first grooves translates into a substantially linear radial movement of the linear elements.

7. The deployable device of claim 1, wherein the outer frame and the linear elements comprise polysilicon.

8. The deployable device of claim 1, further comprising a plurality of constrainers for constraining the linear elements to a substantially linear radial movement.

9. The deployable device of claim 8, wherein the constrainers comprise a plurality of radial trenches formed on a substrate, and wherein the linear elements are disposed in their respective radial trenches and are limited substantially to linear motions along the trenches.

10. The deployable device of claim 1, wherein each of the plurality of attachment portions comprises a plurality of layers, and wherein each of the plurality of layers has a plurality of indentations therein configured to grab the flexible lens material.

11. An artificial eye, comprising:
an aperture configured to control a light passage; and
a microautofocus system configured to focus light from the aperture,
wherein the microautofocus system comprises:
a flexible lens;
a generally planar outer frame around the flexible lens and configured to rotate about a center point; and
a plurality of linear elements configured to move radially relative to the center point as driven by the rotation of the outer frame,
wherein the outer frame has one or more cam grooves thereon, and wherein the one or more cam grooves have a gradually varying distance from the center point, and
wherein the plurality of linear elements each have one or more fixed pins slidably coupled to one of the one or more cam grooves.

12. The artificial eye of claim 11, wherein the flexible lens is composed of a polymer material.

13. The artificial eye of claim 12, wherein the flexible lens is composed of a polydimethylsiloxane (PDMS).

14. The artificial eye of claim 11, further comprising a sensor configured to sense light from the microautofocus system.

15. A method, comprising:
providing a generally planar outer frame having a plurality of first grooves thereon, wherein the outer frame is disposed around a flexible lens;
providing a plurality of linear elements each having a fixed pin thereon, wherein the pins are slidably coupled to the first grooves, and wherein proximal ends of the plurality of linear elements are coupled to an outer edge of the flexible lens; and applying a tangential force to the outer frame while constraining a rotational motion of the linear elements thereby causing a relative sliding motion between the pins and the first grooves and driving the plurality of linear elements radially thereby changing a focus of the flexible lens.

16. The method of claim 15, wherein the flexible lens is formed by
injecting a lens material into a lens mold canister; and
curing the lens material to form the flexible lens.

17. The method of claim 16, further comprising providing a carrier ring to protect geometric integrity of the flexible lens during fabricating and transporting the flexible lens.

18. The method of claim 15, further comprising printing a repeatable amount of micro droplet to a substrate.

19. The method of claim 15, wherein the applying a tangential force to the outer frame comprises actuating the outer frame using an electrostatic force.

20. A method, comprising:
disposing a lens carrier into an enclosure of a mold canister;
evacuating an enclosure of the mold canister;
injecting a lens material into the enclosure; and
curing the lens material to form a flexible lens coupled to the lens carrier,
wherein the lens carrier comprises:
a carrier ring; and
a plurality of linear elements disposed radially about the carrier ring,
and wherein the linear elements have a plurality of attachment portions configured to couple to the flexible lens.

21. A lens actuator, comprising:
a generally planar outer frame configured to rotate about a center point;
an electrostatic actuator configured to rotate the outer frame about the center point; and
a plurality of linear elements configured to move radially relative to the center point as driven by the rotation of the outer frame,
wherein the outer frame has one or more first grooves thereon, and wherein the one or more first grooves have a gradually varying distance from the center point, and
wherein the plurality of linear elements each have one or more fixed pins slidably coupled to one of the one or more first grooves,
and wherein the plurality of linear elements are configured to be coupled to a flexible lens to change a shape of the flexible lens through the radial motion of the linear elements.

22. The lens actuator of claim 21, wherein the electrostatic actuator comprises a plurality of extrusions telescopically coupled to a plurality of corresponding retentions.

* * * * *